United States Patent [19]

Nilsson et al.

[11] 4,409,601

[45] Oct. 11, 1983

[54] MOSAIC RECORDER WITH REDUCED MECHANICAL COUPLING

[75] Inventors: Kenth Nilsson, Akersberga; Jan Bolmgren, Vaellingby, both of Sweden

[73] Assignee: Siemens Aktiengesellschaft, Berlin & Munich, Fed. Rep. of Germany

[21] Appl. No.: 361,982

[22] Filed: Mar. 25, 1982

[30] Foreign Application Priority Data

Apr. 8, 1981 [DE] Fed. Rep. of Germany ....... 3114192

[51] Int. Cl.[3] .......................... G01D 15/18; B41J 3/04

[52] U.S. Cl. ................................. 346/140 R; 310/330

[58] Field of Search .................... 346/140 R; 310/330, 310/368, 370, 312

[56] References Cited

U.S. PATENT DOCUMENTS 3,950,760 4/1976 Rauch ................................. 346/140

4,072,959 2/1978 Elmquist ............................. 346/140

*Primary Examiner*—Joseph W. Hartary

*Attorney, Agent, or Firm*—Hill, Van Santen, Steadman & Simpson

[57] ABSTRACT

A mosaic recorder for ejecting liquid droplets for punctiform representation of characters or images on a recording medium has nozzles arranged in rows in front of the recording medium, each nozzle having a piezoelectric transducer associated therewith, the individual transducers being bilaminar teeth of a comb-like piezoplate consisting of piezoceramic material and a carrier material. The piezoplate has a base by which the transducers are attached to a recording head. For reducing the mechanical coupling between the transducer teeth so that transmission of coupling forces from an activated transducer tooth to the adjacent transducer teeth is substantially eliminated, the ceramic material between the teeth in the area of the comb base is removed so as to provide a gap between adjacent teeth.

1 Claim, 4 Drawing Figures

MOSAIC RECORDER WITH REDUCED MECHANICAL COUPLING

BACKGROUND OF THE INVENTION

1. Field of the Invention

The present invention relates to mosaic ink recording devices.

2. Description of the Prior Art

Mosaic ink recording devices are known in the art such as, for example, the recorder described in German OS No. 2,527,647. Such recorders print alphanumeric characters and images in punctiform representation by ejecting ink droplets from closely-spaced nozzles or jets disposed in rows in front of the recording medium. Each nozzle has an ink inlet opening in front of which is disposed a piezoelectric transducer in the form of a strip or a bar. The free end of each transducer is normally spaced slightly away from the inlet opening and when ink is to be ejected from the particular nozzle associated therewith, a voltage is applied to the transducer causing the transducer to move toward the inlet opening thereby forcing recording fluid through the nozzle from which it is ejected onto the recording medium. The individual transducers are formed by the teeth of a comb-like piezoplate, the plate material also being bilaminar, consisting of piezoceramic material and a carrier material.

In conventional mosaic printers of the type described above, a substantial degree of mechanical coupling is present between the transducer teeth, and particularly between adjacent transducer teeth, via the common comb base of the piezoplate. If a transducer tooth is excited by a voltage so as to bend that particular transducer, adjacent teeth also bend because of the mechanical coupling to a lesser extent and with a certain delay. Because of the mechanical coupling further remote teeth are also influenced, however the excitation of such teeth decreases with the distance from the excited transducer tooth. In conventional recorders of the type identified above, the comb base of the piezoplate is mounted on a carrier which is part of the recording head, so that this portion of the piezoplate cannot be bent. If the comb base of the piezoplate to be clamped on the carrier of the recorder is somewhat bent, the plate may easily break during clamping.

Because of the mechanical coupling between the teeth, the possibility also exists that ink may be transferred from the region surrounding adjacent teeth to the region in front of the nozzle of the excited transducer tooth. In order to achieve a good recording quality, each tooth, prior to its activation, must be in a rest position. If two adjacently disposed teeth are to be activated immediately in succession, the initially activated tooth should not be permitted to set the adjacent tooth into oscillation. If this occurs, the time spacing between the activation pulses must be made sufficiently long such that the oscillation of the adjacent tooth has decayed to a sufficient degree. This results in a significant decrease in the maximum recording speed.

SUMMARY OF THE INVENTION

It is an object of the present invention to provide a mosaic recorder having a piezoplate with a plurality of transducer teeth in which the mechanical coupling between the transducer teeth is substantially reduced such that transmission of forces from an activated transducer tooth to the adjacent teeth is substantially eliminated.

It is a further object of the present invention to provide a mosaic recorder in which the piezoplate is sufficiently flexible such that the possibility of breaking the piezoplate during clamping of the plate to the recording head is substantially eliminated.

The above objects are inventively achieved in a mosaic recorder having a bilaminar piezoplate consisting of piezoceramic material and a carrier material wherein the ceramic material over the base portion of the plate is removed in those areas which are extensions of the interstices between the transducer teeth. Because only the carrier material interconnects the teeth in the base portion of the recorder constructed in accordance with the principles of the present invention, mechanical coupling between the teeth is reduced to such an extent that upon the activation of a particular transducer tooth, the adjacent teeth are not influenced. The removal of selected areas of ceramic material also makes the piezoplate sufficiently flexible such that the possibility of breaking the plate while clamping the plate to the recording head at the comb base is substantially eliminated.

DESCRIPTION OF THE PREFERRED EMBODIMENTS

Figure 3:
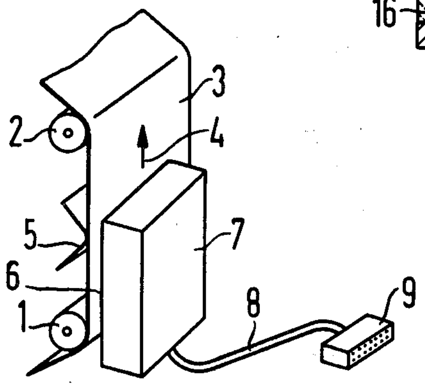
FIG. 3 is a perspective view of the basic elements of a mosaic recorder.

The basic elements of a mosaic recorder of the type which is known to those skilled in the art, and in which the invention disclosed and claimed herein may be employed, are shown in FIG. 3. A recording medium 3, such as paper, is moved by means of transport rollers 1 and 2 in the direction of arrow 4 over a spacer 5 parallel to a side 6 of a recording head mounted in a housing 7. The rollers 1 and 2 are driven by suitable drive means which are not shown. The recording head in the housing 7 has an input line 8 terminating in a connector 9 for connection to a suitable control apparatus (not shown) which provides control signals to the recording head for printing the desired characters or images in punctiform representation.

Figure 4:
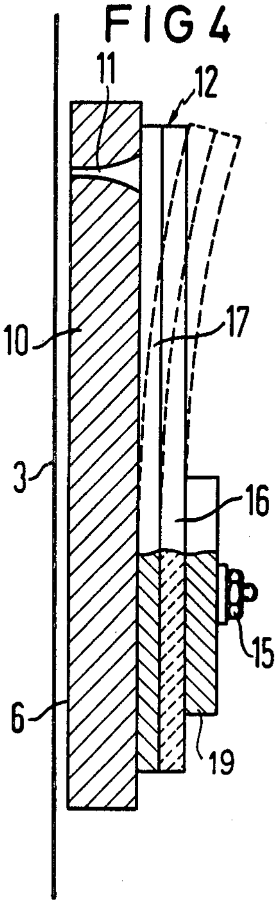
FIG. 4 is a sectional view taken along line IV—IV of FIG. 1 showing the juxtaposition of the recording head with a recording medium.
Figure 1:
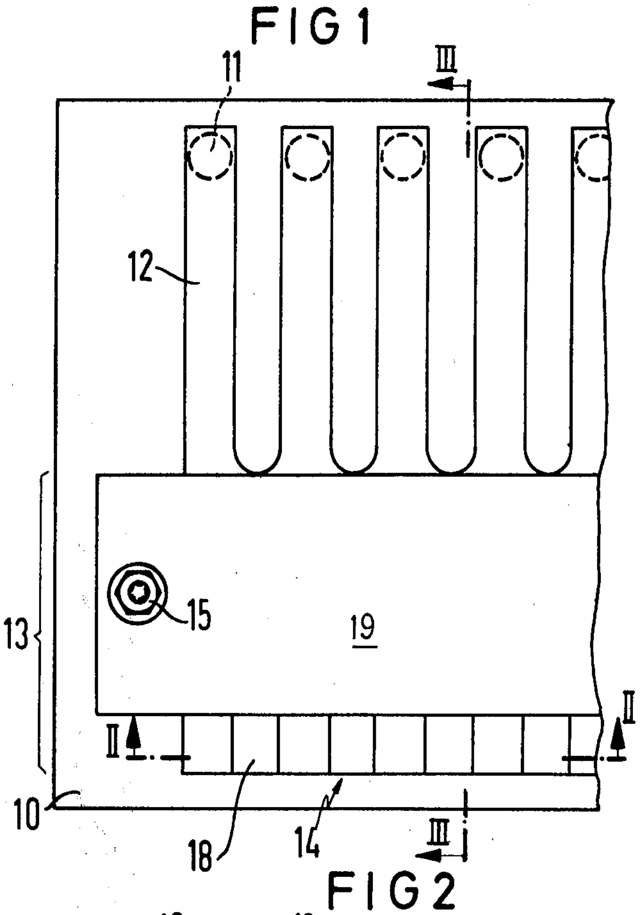
FIG. 1 is a plan view of a comb-type piezoplate for a mosaic recorder constructed in accordance with the principles of the present invention.
Figure 2:
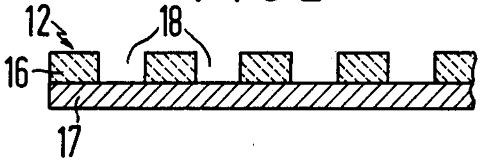
FIG. 2 is a sectional view of the piezoplate shown in FIG. 1 taken along line II—II.

The elements of the recording head insofar as they relate to the subject matter disclosed and claimed herein are shown in enlarged detail in FIGS. 1, 2 and 4.

As best seen in FIG. 4, the recording head 10 has a side 6 which is mounted substantially parallel to and spaced a slight distance from the moving recording medium 3. The recording head 10 has a plurality of nozzles 11 disposed adjacent to one another in the recording head 10 in rows. Each nozzle 11 has a transducer 12 associated therewith which upon the application of a voltage thereto, assumes the position shown in the dashed lines in FIG. 4. Upon the occurrence of a brief interruption of the applied voltage, the transducer 12 assumes the position shown in the solid lines of FIG. 4, thereby causing a droplet of recording fluid, such as ink, to be ejected from the associated nozzle 11 onto the moving recording medium 3.

The transducers 12 form the teeth of a comb-like piezoplate 14 which has a lower base portion 13 at which the plate 14 is mounted to the recording head 10. The piezoplate 14 is bilaminar and consists of a piezoceramic layer 16 and a metal carrier layer 17. The comb base 13 is mounted to the recording head 10 by a retainer plate 19 which is held in place by retainers such as a bolt 15.

As best seen in FIG. 2, regions in the base portion 13 of the piezoplate 14 which are extensions of the interstices between the transducer teeth 12 have the ceramic layer 16 removed therefrom so that a plurality of gaps 18 exists in the base portion 13. It will be understood that the structure shown in the drawings is greatly enlarged and the distance between each nozzle 11, and thus also the distance between each transducer tooth 12, is in practice approximately 250 micrometers.

Because only the metal layer 17 interconnects the transducer teeth 12, a maximum reduction of the mechanical coupling between the transducer teeth 12 is obtained. A good recording quality and a high recording speed can be achieved with this structure. Moreover, the presence of the gaps 18 results in significantly lower mechanical stress on the base portion 13 of the piezoplate 14 during clamping of the plate 14 to the recording head 10, thereby significantly decreasing the danger of cracking or breaking the ceramic material 16.

As stated above, the carrier layer 17 may be, for example, metal, and the ceramic layer 16 may be, for example, glass, aluminum oxide or silicon.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a mosaic recorder having a plurality of nozzles through which a recording liquid is ejected for printing alphanumeric characters and images in punctiform representation on a moving recording medium, said nozzles being disposed adjacent one another in rows in a recording head, and each nozzle having an inlet opening, the improvement comprising:

a comb-like bilaminar piezoplate having a plurality of teeth respectively overlying said inlet openings of said nozzles, each tooth being a transducer for selectively causing a droplet of recording liquid to be ejected from the nozzle associated therewith, said piezoplate having a base portion which is clamped to said recording head, said piezoplate consisting of a layer of piezoceramic material and a carrier layer and having a base portion, the ceramic layer of said base portion of said piezoplate having a puraity of gaps disposed in regions corresponding to extensions of the interstices between said transducer teeth, whereby said gaps substantially eliminate mechanical coupling between said transducer teeth such that actuation of one of said transducer teeth has substantially no influence on others of said transducer teeth.

* * * * *